Sept. 26, 1939.　　　　J. W. LOGAN, JR　　　　2,173,944
TRACTION INCREASING DEVICE
Filed April 17, 1937　　　3 Sheets-Sheet 1
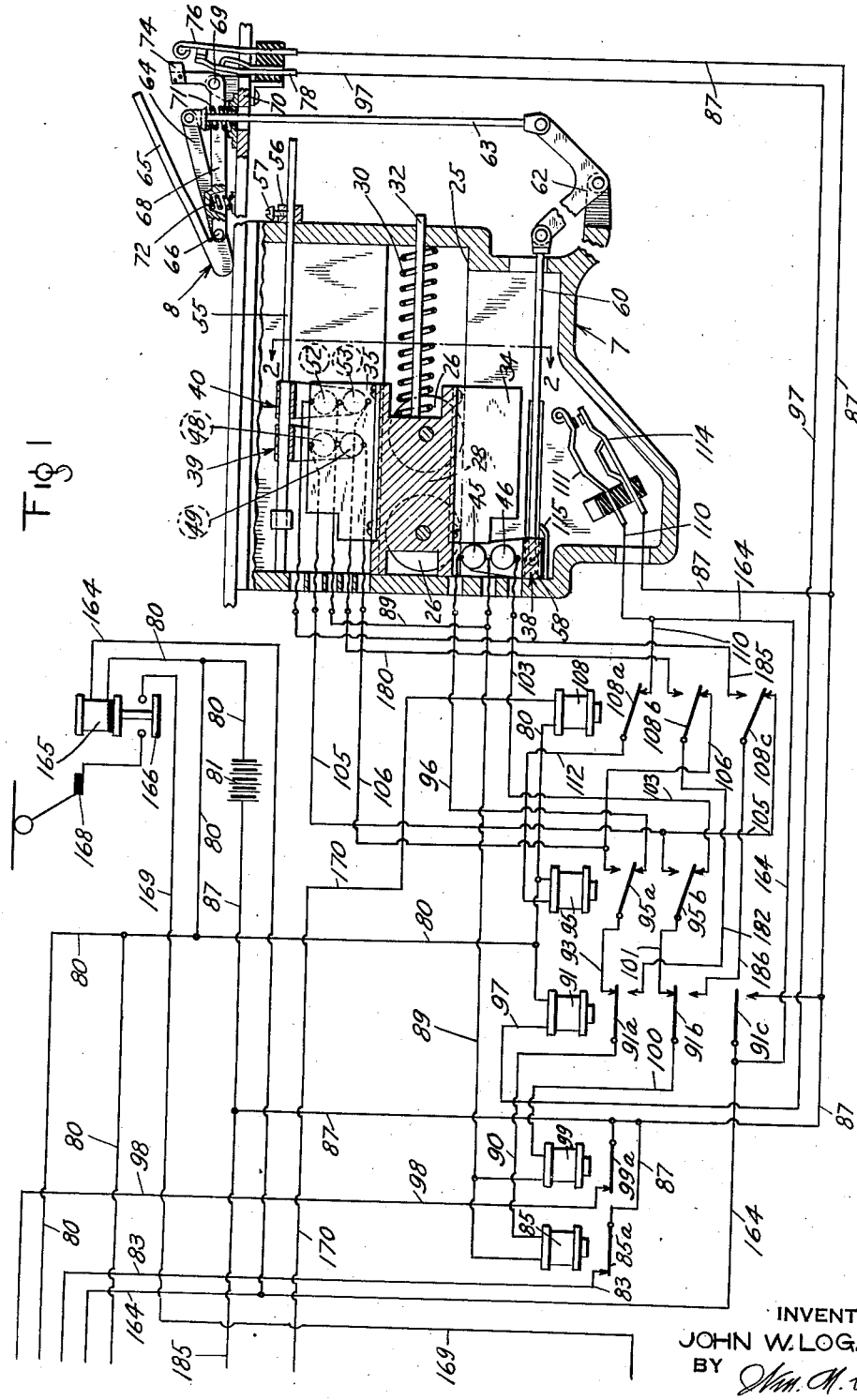
INVENTOR
JOHN W. LOGAN, JR.
BY
ATTORNEY Sept. 26, 1939.   J. W. LOGAN, JR   2,173,944
TRACTION INCREASING DEVICE
Filed April 17, 1937   3 Sheets-Sheet 2
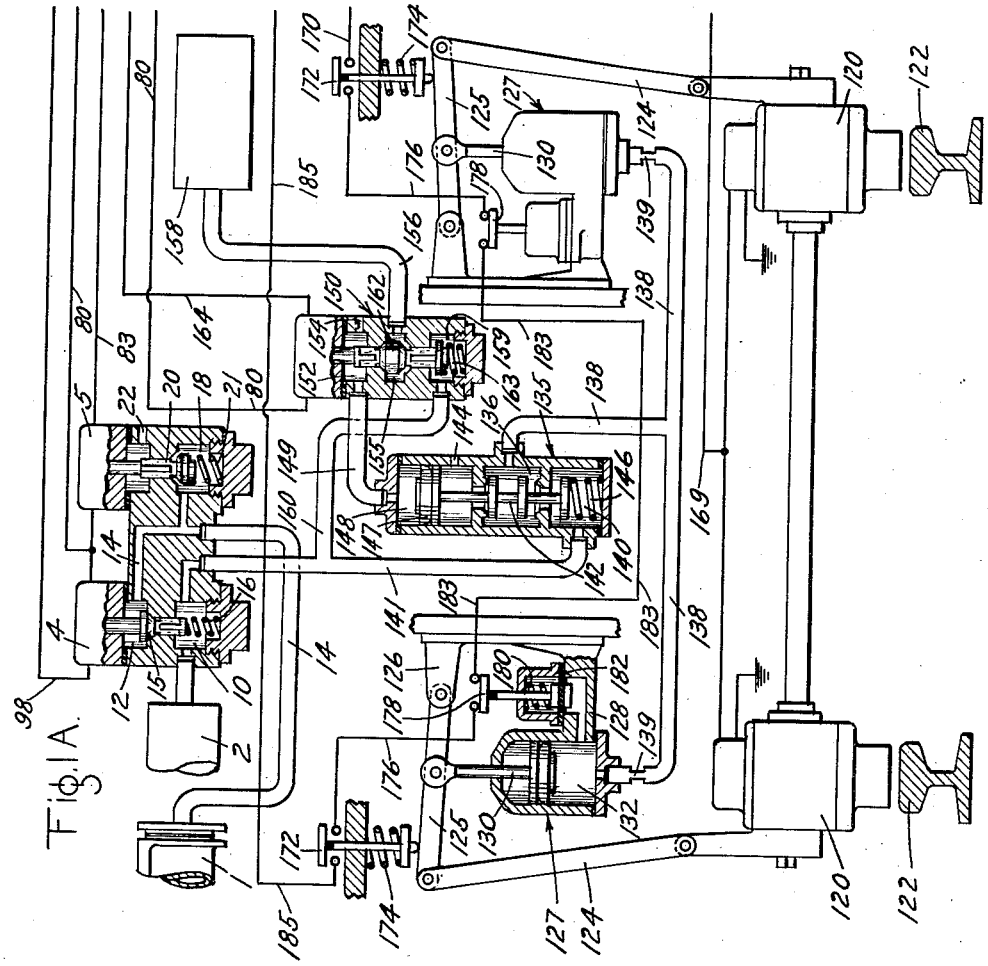
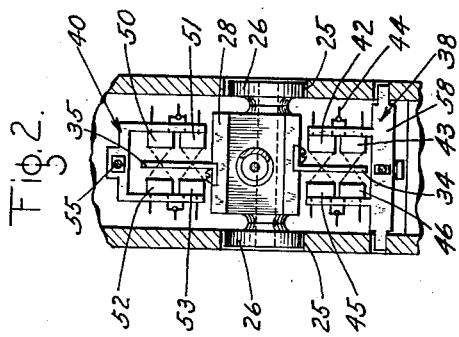
INVENTOR
JOHN W. LOGAN, Jr.
BY Wm. N. Cady
ATTORNEY

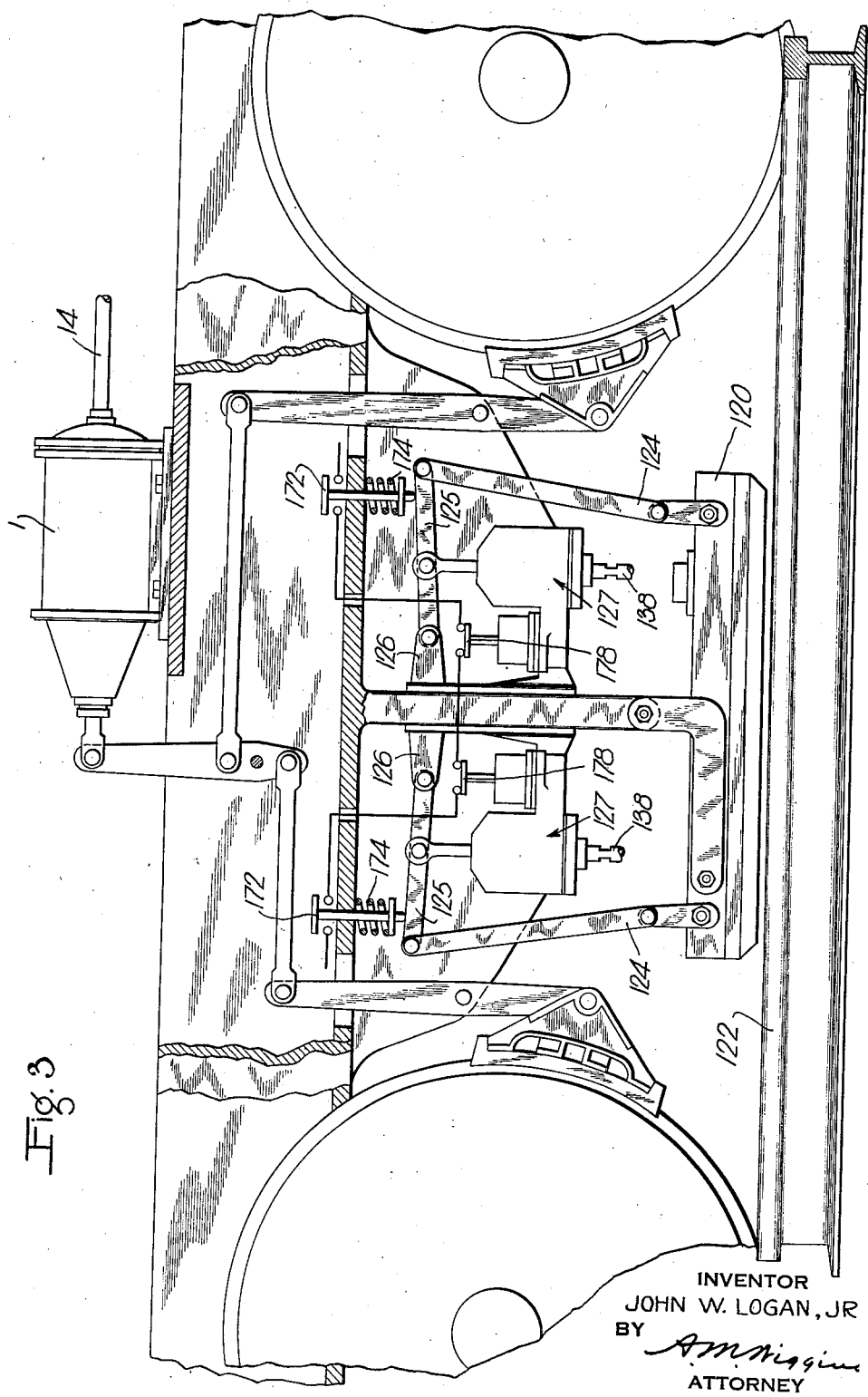

Patented Sept. 26, 1939

2,173,944

UNITED STATES PATENT OFFICE 2,173,944

TRACTION INCREASING DEVICE

John W. Logan, Jr., Forest Hills, Pa., assignor to The Westinghouse Air Brake Company, Wilmerding, Pa., a corporation of Pennsylvania Application April 17, 1937, Serial No. 137,449

17 Claims. (Cl. 303—3)

This invention relates to a brake equipment for a railway vehicle and more particularly to improved means to increase the adhesion between the vehicle wheels and the rails on which they operate.

It has heretofore been proposed to employ an electromagnet or booster carried by a vehicle truck to exert force during an application of the brakes to supplement the force exerted by the weight of the vehicle to press the vehicle wheels against the rails. The magnets heretofore employed have not engaged the rail, but have been spaced therefrom a short distance, at all times, with the result that these magnets have not been able to exert very large forces tending to press the vehicle wheels against the rails.

In addition, it has heretofore been proposed to provide a magnetic track brake shoe which is adapted to be moved adjacent to or into engagement with the rail, and to be energized to hold the shoe in engagement with the rail to create retarding force between the track brake shoe and the rail. At relatively high vehicle speeds the braking force created by a magnetic track brake shoe is relatively small, and is substantially less than would result if the force employed to hold the track brake shoe against the rail were employed to increase the force pressing the vehicle wheels against the rails, thereby increasing the adhesion between the wheels and the rails and permitting greater braking forces to be applied through the vehicle wheels.

As a magnetic track brake shoe is held in engagement with the rail during an application, a substantially greater magnetic pull is developed between the shoe and the rail for a similar expenditure of excitation power than is developed by the magnetic adhesion boosters heretofore provided, in which the magnets are spaced from the rail at all times.

It is an object of this invention to provide an improved brake equipment for a railway vehicle, the brake equipment including means to create retarding force on the vehicle wheels, and means for increasing the adhesion between the vehicle wheels and the rails, the adhesion increasing means comprising a magnetic track shoe adapted to engage the rail and to be held in engagement therewith by magnetic attraction, together with means associated with the track shoe for exerting force supplementing the weight of the vehicle and tending to press the vehicle wheels against the rails.

A further object of the invention is to provide an improved vehicle brake equipment of the type described and incorporating means automatically operable on a predetermined application of the brakes to first effect movement of the track shoe into engagement with the rail, and to effect energization of the winding of the shoe, and to thereafter exert force on the shoe tending to move it away from the rail to thereby create a force which causes the vehicle wheels to be pressed against the rails.

Another object of the invention is to provide a vehicle brake equipment of the type described and incorporating automatic means operable in the event that the track shoe is unintentionally moved away from the rail to effect a reduction in the braking effect permitted through the vehicle wheels to thereby prevent wheel sliding.

A further object of the invention is to provide an improved vehicle brake equipment of the type described and incorporating means responsive to the rate of retardation of the vehicle for controlling the degree of braking effect transmitted through the vehicle wheels, together with means controlled by the adhesion increasing means for controlling the operation of the retardation responsive means.

Another object of the invention is to provide an improved vehicle brake equipment of the type described and incorporating a deadman control device, and having means operative on the release of manually applied pressure from the deadman control device to automatically condition the retardation controller to permit the maximum rate of retardation.

A further object of the invention is to provide an improved vehicle brake equipment of the type described and incorporating means automatically operable on the release of manually applied pressure from the deadman control device to effect operation of the adhesion increasing means to increase the adhesion between the vehicle wheels and the rails, and to condition the brake applying means to produce the maximum degree of braking effect on the vehicle wheels.

Another object of the invention is to provide an improved vehicle brake equipment of the type described and incorporating means to delay the release of the adhesion increasing means to insure that the means for exerting braking force through the vehicle wheels will be released enough to prevent wheel sliding when the adhesion increasing means is released.

A further object of the invention is to provide an improved vehicle brake equipment.

Other objects of the invention and features of novelty will be apparent from the following description taken in connection with the accompanying drawings, in which, Figs. 1 and 1A taken together form a diagrammatic view of a vehicle brake equipment embodying this invention, Fig. 2 is a fragmentary sectional view taken substantially along the line 2—2 of Fig. 1, and Fig. 3 is an elevational view of the truck of a vehicle equipped with the apparatus provided by this invention.

Referring to the drawings the vehicle brake equipment shown therein incorporates fluid pressure braking means including a brake cylinder 1 for exerting braking effect through suitable brake rigging and brake shoes upon the vehicle wheels to retard the vehicle. While fluid pressure operated braking means is shown, it should be understood that the invention is not limited to this form of braking means to exert braking effort through the vehicle wheels, and that the use of other types of the braking means, such as hydraulic, dynamic, or other forms, is contemplated.

The brake equipment shown in the drawings includes a supply reservoir 2, an application magnet valve device 4, and a release magnet valve device 5. The supply of current to the windings, not shown, of these magnet valve devices is controlled by a retardation control device which is indicated generally by the reference numeral 7, and which has associated therewith a deadman control device or foot pedal device indicated generally by the reference numeral 8 by which the rates of retardation which the retardation control device is adjusted to effect may be adjustably varied.

The application magnet valve device 4 comprises a body having a chamber 10 therein which is constantly connected with the supply reservoir 2. The application magnet valve device 4 also has a chamber 12 therein which is constantly connected by way of a passage and pipe 14 with the brake cylinder 1. A valve 15 is mounted in the chamber 12 and controls communication between the chamber 10 and the chamber 12. The valve 15 is yieldingly urged to the open position by a spring 16, while the valve is moved to the seated position on energization of the winding, not shown, of the magnet valve device.

The release magnet valve device 5 comprises a body having a chamber 18 therein which is constantly connected with the brake cylinder 1 by way of the passage and pipe 14. A valve 20 is mounted in the chamber 18 and is yieldingly urged to the seated position by a spring 21 to cut off communication between the chamber 18 and the atmospheric passage 22. On energization of the winding, not shown, of the release magnet valve device 5 the valve 20 is moved against the spring 21 away from its seat to open communication from the chamber 18 to the atmosphere through the passage 22.

The retardation control device 7 is embodied in a casing having formed thereon a trackway indicated at 25 and adapted to receive wheels 26 which support a movable weighted body 28. The body 28 is yieldingly urged toward the left, as viewed in Fig. 1 of the drawings, by a spring 30 mounted on a rod 32 which has one end thereof secured to the body 28, while the other end of this rod extends through and is guided by a bore in the casing of the retardation control device. The retardation control device 7 is mounted on the train or vehicle so that when the train or vehicle is decelerating the weighted body 28 is urged to the right against the opposition of the spring 30 according to the rate of retardation of the vehicle or train.

Rigidly secured to the under side of the body 28 is a downwardly extending fin 34, while a similar upwardly extending fin 35 is secured to the upper side of the body 28, as is best shown in Fig. 2 of the drawings.

The fin 34 is adapted to control the operation of the service photo-electric means, preferably of the type sometimes referred to briefly as photo-electric cell devices, and designated in its entirety by the reference numeral 38. The fin 35 is similarly adapted to control the operation of a like emergency photo-electric means, designated in its entirety by the reference numeral 39, and to also control the operation of photo-electric means designated by the reference numeral 40.

As is clearly shown in Fig. 2 of the drawings, the photo-electric means 38 comprises two lamps 42 and 43, which are adapted to be connected to a suitable source of current, not shown, by means of wires indicated at 44 in Fig. 2, but not shown in Fig. 1 of the drawings. The lamps 42 and 43 are adapted to produce light beams which when uninterrupted impinge upon photo-electric cell devices 45 and 46, respectively, the light beams being depicted by dotted lines in the drawings. The characteristic of the photo-electric cell devices 45 and 46 of importance is that each of these devices will produce an electric current when a beam of light is impinged thereon, but when the beam of light is interrupted, as by the passage of the fin 34 between the light source and the photo-electric cell, the electric current will immediately diminish substantially to zero or to a low ineffective value.

The photo-electric means 39 is substantially a duplicate of the photo-electric means 38, the photo-electric cells thereof being designated in Fig. 1 of the drawings by the numerals 48 and 49.

The photo-electric means 40 is likewise substantially a duplicate of the photo-electric means 38, and consists of light producing lamps 50 and 51, and photo-electric cells 52 and 53.

The photo-electric means 39 and 40 are supported on brackets which are carried by a rod 55 which is adjustably supported from the casing of the retardation control device 7. The rod 55 is held in the adjusted position by means of a collar 56 and a set screw 57.

The photo-electric means 38 is mounted on a slide or crosshead member 58 having tongues extending from the ends thereof, which are slidable in grooves or slots formed in the casing of the retardation control device. One end of a link 60 is pivotally connected to the crosshead 58, while the other end of this link is pivotally connected to one arm of a bell crank 62 which is pivotally supported on the casing of the retardation control device. The other arm of the bell crank 62 has one end of a link 63 pivotally connected thereto, while the other end of this link is pivotally connected to the end of an arm 64 formed integral with a foot pedal 65 of the foot pedal device 8. The arm 64 is pivotally supported by means of a pin 66 on the end of an arm or lever 68, which is pivotally supported by means of a pin 69 on a portion of the vehicle structure indicated at 70. A coil spring 71 is mounted on the rod 63 and extends between a collar on the end of this rod and the vehicle structure 70, and yieldingly urges the right hand end of the arm 64 upwardly, as viewed in Fig. 1 of the drawings, to the position in which the crosshead 58 is held adjacent the left hand end of the casing of the retardation control device 7, which is the release position of the crosshead 58.

A coil spring 72 extends between the portion 70 of the vehicle structure and the lever 68 and yieldingly urges this lever in a clockwise direction about the pin 69 upon the release of manually applied pressure from the heel portion of the foot pedal 65, so that an insulating block 74 carried by an arm of the lever 68 engages a movable contact 76 and moves the contact carried thereby away from a stationary contact 78.

One terminal of the winding of the application magnet valve device 4 and of the winding of the release magnet valve device 5 are connected by way of a wire 80 to one terminal of a suitable source of current, such as the battery indicated at 81. The other terminal of the winding of the release magnet valve device 5 is connected by way of a wire 83 to a stationary contact associated with a relay 85 which has a movable contact 85a associated therewith to which is connected a wire 87 which leads to the other terminal of the battery 81.

One terminal of the winding of the relay 85 is constantly connected by way of a wire 89 to one terminal of each of the photo-electric cells 45 and 46 of the photo-electric means 38. The other terminal of the winding of the relay 85 is connected by way of a wire 90 to a movable contact 91a associated with a relay 91. Upon energization of the winding of the relay 91 the movable contact 91a engages a stationary contact which is connected by way of a wire 93 to a movable contact 95a associated with a relay 95. When the winding of the relay 95 is deenergized, the movable contact 95a engages a stationary contact which is connected by way of a wire 96 to the other terminal of the photo-electric cell 45.

One terminal of the winding of the relay 91 is connected by way of a branch of the wire 80 to one terminal of the battery 81, while the other terminal of the winding of the relay 91 is connected by way of a wire 97 to the stationary contact 78 associated with the foot pedal device 8. On the application of manually applied pressure to the heel portion of the pedal 65 insulating element 74 carried by the lever 68 is moved out of engagement with the movable contact 76 and permits this contact to be moved into engagement with the stationary contact 78. The movable contact 76 is constantly connected by way of a branch of the wire 87 with one terminal of the battery 81, with the result that when the movable contact 76 engages the stationary contact 78, a circuit is established through the winding of the relay 91 and causes the movable contacts thereof to be moved to their upper positions as shown in Fig. 1 of the drawings.

When the movable contact 91a of the relay 91 is in its upper position as shown, therefore, a circuit is established from one terminal of the winding of the relay 85 to a terminal of the photo-electric cell 45, which circuit is traced through the wire 90 to the movable contact 91a of the relay 91, wire 93 to the movable contact 95a of the relay 95, and wire 96.

One terminal of the winding of the application magnet valve device 4 is connected by way of the wire 98 to a stationary contact associated with the relay 99. On energization of the winding of the relay 99 the movable contact 99a is held in engagement with this stationary contact, while the movable contact 99a has connected thereto a branch of the wire 87 leading from the battery 81.

One terminal of the winding of the relay 99 is connected by way of a branch of the wire 89 to the photo-electric cell 46, while the other terminal of the winding of the relay 99 is connected by way of the wire 100 to a movable contact 91b associated with the relay 91. The movable contact 91b is adapted, while the winding of the relay 91 is energized, to engage a stationary contact which is connected by way of a wire 101 with a movable contact 95b associated with the relay 95, which when the winding of this relay is deenergized, engages a stationary contact which is connected by way of a wire 103 to the other terminal of the photo-electric cell 46. It will be seen, therefore, that when the winding of the relay 91 is energized, which is the case at all times during normal operation of the vehicle as manually applied pressure is maintained on the heel portion of the pedal 65 of the foot pedal device 8, a circuit is maintained from the photo-electric cell 46 through the winding of the relay 99.

*Operation during normal service applications and releases of the brakes*

The portion of the brake equipment thus far described is similar both in construction and operation to that shown in my U. S. Patent 2,017,667, issued October 15, 1935. During operation of this equipment, assuming that manually applied pressure is maintained on the heel portion of the pedal 65 of the foot pedal device 8 so that the movable contact 76 engages the stationary contact 78, thereby supplying current to the winding of the relay 91, and assuming also that the photo-electric means 38 is in the release position so that the light beams impinge upon the photo-electric cells of this means, the windings of the relays 85 and 99 will be energized with current supplied by the photo-electric cells 45 and 46, respectively.

As the winding of the relay 85 is energized, the movable contact 85a is maintained in the closed position, thereby establishing a circuit through the winding of the release magnet valve device 5 with the result that the valve 20 thereof is held against the spring 21 to open communication between the chamber 18 and the atmosphere through the passage 22, thus connecting the brake cylinder 1 to the atmosphere and releasing the brakes.

In addition, at this time, as the winding of the relay 99 is energized, the movable contact 99a is maintained in the closed position to maintain a circuit through the winding of the application magnet valve device 4 with the result that the valve 15 is held in the seated position to cut off the supply of fluid under pressure from the supply reservoir 2 to the chamber 12 and thence to the brake cylinder 1.

When it is desired to effect a normal service application of the brakes, pressure is maintained on the heel portion of the foot pedal, while the toe portion of the foot pedal 65 is depressed, causing the foot pedal 65 and the arm 64 to pivot about the pin 66. This movement of the arm 64 is transmitted through the link 63 and the bell crank 62 to the link 60, moving this link to the right, as viewed in Fig. 1 of the drawings, and causing the crosshead or slide 58 to move to the right a distance in accordance with the downward movement of the foot pedal 65.

On initial movement of the crosshead or slide 58, the fin 34 intercepts the light beam from the lamp 42 to the photo-electric cell 45, thereby interrupting the supply of current to the winding of the relay 85. Upon interruption of the supply of current to this winding, the movable contact 85a thereof moves to the open position, thus interrupting the circuit to the winding of the release magnet valve device 5. On the interruption of the supply of current to the winding of this magnet valve device, the valve element 18 is moved to the seated position by the spring 21, thus cutting off communication between the brake cylinder 1 and the atmosphere.

Upon further movement of the crosshead or slide 58, the supply of light to the photo-electric cell 46 is cut off, thereby cutting off the supply of current to the winding of the relay 99. On the interruption of the supply of current to the winding of this relay the movable contact 99a is moved to the open position, thus interrupting the supply of current to the winding of the application magnet valve device 4, and upon the interruption of the supply of current to this winding the valve 15 is moved to the open position by the spring 16 to permit fluid under pressure supplied from the supply reservoir 2 to the chamber 10 to flow to the chamber 12, and thence by way of the passage and pipe 14 to the brake cylinder 1.

As a result of the supply of fluid under pressure to the brake cylinder 1 force is exerted by the brake cylinder piston to press the brake shoes against the vehicle wheels, not shown, to exert braking force through the wheels to retard the vehicle, and the resulting force of inertia acting on the weighted body 28 causes it to move to the right, as viewed by Fig. 1 of the drawings, against the spring 30. On this movement of the weighted body 28, the fin 34 carried thereby is moved relative to the photo-electric means 38.

If the rate of retardation exceeds a predetermined valve, dependent upon the position to which the photo-electric means 38 has been moved by operation of the foot pedal device 8, the fin 34 will be moved to a position in which the notched left-hand edge of the fin continues to intercept the beam of light from the lamp 42 to the photo-electric cell 45, but in which it does not intercept the beam of light from the lamp 43 to the photo-electric cell 46. On movement of the fin 34 to this position current is again supplied by the photo-electric cell 46 to the winding of the relay 99, and upon energization of this winding the movable contact 99a is moved to the closed position to establish the circuit from the battery 81 through the winding of the application valve device 4. On the supply of current to this winding the valve 15 is moved to the seated position to cut off the supply of fluid under pressure to the brake cylinder 1, thereby preventing a further increase in the degree of application of the brakes.

If the photo-electric means 38 remains in the position to which it has been moved, and if there is a further increase in the rate of deceleration of the vehicle, the weighted body 28 will be moved farther to the right against the spring 30, and the fin 34 will be moved to a position in which it no longer intercepts the beam of light from the lamp 42 to the photo-electric cell 45. When the fin 34 is moved to this position the photo-electric cell 45 again supplies current to the winding of the relay 85, and upon energization of this winding the movable contact 85a is moved to the closed position to again establish the circuit from the battery 81 through the winding of the release magnet valve device 5. Upon the supply of current to this winding, the valve 20 is moved away from its seat against the spring 21 to open communication from the chamber 18 to the atmosphere through the passage 22, thereby releasing fluid under pressure from the brake cylinder and effecting a decrease in the degree of application of the brakes.

As a result of this reduction in the degree of application of the brakes, there will be a decrease in the rate of retardation of the vehicle, and a corresponding decrease in the force of inertia operating on the weighted body 28, with the result that the spring 30 will move the body 28 to the left from the position to which it has been moved by the force of inertia. If the photo-electric means 38 remains in the position to which it has been moved, the fin 34 may be moved to a position in which it again intercepts the supply of light from the lamp 42 to the photo-electric cell 45, and if this condition occurs, current will no longer be supplied by the photo-electric cell 45 to the winding of the relay 85 and the movable contact 85a thereof will be moved to the open position to interrupt the circuit to the winding of the release magnet valve device 5 with the result that this magnet valve device will be operated to again cut off the release of fluid from the brake cylinder, thus preventing a further decrease in the degree of application of the brakes.

On the release of manually applied pressure from the toe portion of the foot pedal 65 while pressure is maintained on the heel portion thereof, the spring 71 returns the photo-electric means 38 to the position in which it is shown in Fig. 1 of the drawings, in which position the fin 34 does not intercept the light beams associated with the photo-electric cells 45 and 46. These cells then supply current to the relays associated therewith, and these relays condition the magnet valve devices to cut off the supply of fluid under pressure to the brake cylinder and to release fluid therefrom, thus effecting the release of the brakes.

*Construction of means for limiting degree of application of the brakes on normal service application.*

The photo-electric means 39 associated with the retardation control device 7 operates to limit the rate of retardation which this device permits, and to thereby limit the degree of application of the brakes to a value which will not produce wheel sliding.

It will be seen that one terminal of each of the photo-electric cells 48 and 49 is connected to a branch of the wire 89, which is connected to the windings of the relay 85 and 99, and that the other terminal of the photo-electric cell 48 has connected thereto a wire 105 which is connected to a stationary contact which is adapted to be engaged by a movable contact 108c of a relay 108 when this contact is in its lower position. It will be seen also that the other terminal of the photo-electric cell 49 is connected by way of a wire 106 with a stationary contact adapted to be engaged by a movable contact 108b associated with the relay 108. The relay 108 has another movable contact 108a associated therewith and adapted to engage a stationary contact which is connected by way of a wire 110 with a contact 111 which is supported by suitable insulating material from the body of the retardation control device 7. The movable contact 108a is connected by way of a wire 112 with one terminal of the winding of the relay 95, the other terminal of which is connected by way of the wire 80 to one terminal of the battery 81.

The movable contact 111 associated with the retardation control device 7 is adapted at certain times to engage a stationary contact 114 which is connected by a branch of the wire 87 to one terminal of the battery 81.

The winding of the relay 108 is deenergized except at certain times, as will hereinafter more fully appear, with the result that during service applications of the brakes the movable contacts 108a, 108b, and 108c associated with the relay 108 remain in the positions in which they are shown in Fig. 1 of the drawings.

The movable slide or crosshead 58 is provided with a shoe indicated at 115 which is arranged to engage the end of the movable contact 111 when the slide or crosshead 58 has been moved to a position to hold the cells 45 and 46 of the photo-electric means 38 substantially in the same vertical plane as the cells 48 and 49 of the photo-electric means 39. When the shoe 115 engages the end of the movable contact 111, it presses the movable contact downwardly so that the contact touches the stationary contact 114, thereby establishing a circuit leading from the battery 81 by way of the wire 87 through the contacts 114 and 111 to the wire 110 to the movable contact 108a, which is in the closed position at this time, as explained above, and thence to the wire 112 leading to one terminal of the winding of the relay 95. The other terminal of the winding of the relay 95 is connected to the other terminal of the battery 81 by way of the wire 80 so that a circuit is established through the winding of this relay.

Upon energization of the winding of the relay 95 the movable contacts 95a and 95b thereof are moved from the positions in which they are shown in Fig. 1 of the drawings, to positions in which the contact 95a engages a stationary contact which is connected by way of the wire 106 to one terminal of the photo-electric cell 49 associated with the photo-electric means 39. By this movement of the contact 95a the circuit leading from the photo-electric cell 45, associated with the photo-electric means 38, through the wire 96 to the winding of the relay 85 is interrupted, while the winding of the relay 85 is connected to the photo-electric cell 49, as explained above.

On this movement of the movable contact 95b the circuit leading from the photo-electric cell 46, associated with the photo-electric means 38, through the wire 103 and thence to the winding of the relay 99 is interrupted, while the movable contact 95b is moved into engagement with a stationary contact which is connected by way of the wire 105 with the photo-electric cell 48, associated with the photo-electric means 39.

It will be seen, therefore, that when the movable slide or crosshead 58 has been moved by the foot pedal device 8 to a predetermined position in its range of movement, the shoe 115 engages the movable contact 111 and causes it to engage the contact 114 to thereby energize the winding of the relay 95, thus causing the control of the relays 85 and 99 to be transferred from the photo-electric cells 45 and 46, respectively, to the photo-electric cells 49 and 48, respectively.

*Operation of means for limiting degree of application of the brakes*

On the initial movement of the slide or crosshead 58 to the right from the position in which it is shown in Fig. 1 of the drawings, it is moved to a position in which the fin 34 intercepts the light beams from the lamps 42 and 43 with the result that the photo-electric cells 45 and 46 no longer supply current to the windings of the relays 85 and 99, causing these relays to cut off the supply of current to the windings of the release magnet valve device 5 and of the application magnet valve device 4 to effect an application of the brakes, as explained in detail above. As a result of the interruption of the light beams directed at the photo-electric cells 45 and 46, therefore, there will be an application of the brakes in effect when the slide 58 is moved to the position in which the shoe 115 engages the end of the movable contact 111 to cause it to complete the circuit through the winding of the relay 95 and cause the control of the relays 85 and 99 to be shifted from the photo-electric cells 45 and 46 to the photo-electric cells 49 and 48.

On the movement of the slide or crosshead 58 to the position to effect the transfer of the control of the relays 85 and 99 to the photo-electric cells 49 and 48, the weighted body 28 will be in a position in which the fin 35 carried thereby intercepts the beams of light directed at the photo-electric cells 49 and 48, with the result that when the control of the relays 85 and 99 is transferred to these photo-electric cells, the windings of these relays remain deenergized and the movable contacts thereof remain in their open positions and continue to interrupt the supply of current to the windings of the release magnet valve device 5 and the application valve device 4.

As a result of the supply of fluid under pressure to the brake cylinder 1, the vehicle will decelerate and the force of inertia operating upon the weighted body 28 causes this body to move against the spring 30. On this movement of the body 28 the fin 35 is moved, and when the rate of retardation of the vehicle reaches a predetermined value, the fin 35 will be moved to a position in which the notched end thereof continues to intercept the light beam directed at the photo-electric cell 49, but no longer intercepts the light beam directed at the photo-electric cell 48. As a result of the supply of light to the photo-electric cell 48, a current is generated by this cell which is supplied by way of the wire 105 and through the movable contact 95b of the relay 95 to the wire 101, and thence by way of the contact 91b and the wire 100 to one terminal of the relay 99. The other terminal of this relay is connected by way of the wire 89 to the other terminal of the photo-electric cell 48. On the supply of current to the winding of the relay 99 the movable contact 99a thereof is moved to the closed position to complete the circuit through the winding of the application magnet valve device 4, and the valve 15 thereof is thereupon moved to the seated position to cut off the supply of fluid under pressure from the supply reservoir 2 to the brake cylinder 1, and thus prevent a further increase in the degree of application of the brakes.

If the rate of retardation of the vehicle continues to increase, there will be further movement of the weighted body 28 against the spring 30, and the fin 35 carried by the body 28 will be moved to a position in which the notched end thereof no longer intercepts the light beam directed at the photo-electric cell 49, and this cell will generate an electric current which is supplied by way of the wire 106 to the movable contact 95a of the relay 95, which contact is in its upper position at this time, as explained above. Upon the supply of current to the movable contact 95a current flows therefrom by way of the wire 93 to the movable contact 91a and through the wire 90 to one terminal of the winding of the relay 85, the other terminal of which is connected by way of the wire 89 to the other terminal of the photo-electric cell 49.

On the supply of current to the winding of the relay 85 the movable contact 85a is moved to the closed position to complete the circuit through the winding of the release magnet valve device 5, whereupon the valve 20 is moved away from its seat to release fluid under pressure from the brake cylinder 1, and thus decrease the degree of application of the brakes and prevent possible wheel sliding.

The photo-electric means 39 is positioned so that the weighted body 28 will be moved to a position in which the fin 35 carried thereby no longer intercepts the light beams directed at the photo-electric cells 48 and 49 when the rate of retardation of the vehicle is slightly less than the rate which is effective to result in wheel sliding. As a result, therefore, the increase in the degree of application of the brake means will be prevented, while fluid will be released from the brake cylinder to limit the degree of application of the brakes to a degree less than that which is effective to cause wheel sliding.

It will be seen, therefore, that when the pedal 65 of the application means 8 is depressed more than a predetermined amount and causes the slide or crosshead 58 to be moved beyond a predetermined point in its range of movement, the control of the braking means is automatically transferred from the photo-electric means 38 carried by the slide 58, to the photo-electric means 39 which operates to limit the degree of brake application effected.

Similarly, on the release of pressure from the toe portion of the pedal 65 the spring 71 expands and effects movement of the crosshead or slide 58 to the left, as view in Fig. 1 of the drawings, while the shoe 115 is moved away from the movable contact 111 and permits this contact to disengage the stationary contact 114, thus interrupting the circuit to the winding of the relay 95. As a result this relay operates to transfer control of the brake equipment from the photo-electric means 39 back to the photo-electric means 38 carried by the slide or crosshead 58, and this photo-electric means operates, as described in detail above, to control the degree of application of the brakes in accordance with the position of the crosshead 58.

Construction of adhesion increasing means

The brake equipment provided by this invention incorporates means automatically operable on a relatively heavy application of the brakes to increase the force effective to press the vehicle wheels against the rails to thereby increase the force of adhesion between the wheels and the rails, while this means also operates to condition the retardation control device 7 to effect a higher rate of retardation than that normally permitted by this device.

The brake equipment provided by this invention includes track shoes 120 which are associated with a truck, not shown, of the vehicle and are adapted to engage the rails upon which the vehicle operates. These track shoes may be of any well known construction and are provided with windings which, when energized, create a magnetic force of attraction between the track shoes and the rails 122.

The vehicle also has associated therewith means adapted to control movement of the track shoes 120 into and out of engagement with the rails 122, and also operating at certain times, as will hereinafter more fully appear, to exert force between the vehicle and the track shoes tending to lift the track shoes away from the rails, thereby causing downwardly directed force to be exerted on the vehicle to press the vehicle wheels against the rails with substantial force supplementing the force exerted by the weight of the vehicle.

As is clearly shown in Fig. 1a and Fig. 3 of the drawings, each of the track shoes 120 has pivotally connected thereto at each end one end of a link 124, the other end of each of which is connected to one end of an arm 125. Each of these arms has its other end secured to a bracket 126 carried by a portion of the vehicle structure, such as one of the vehicle trucks.

While only one lifting means is shown in connection with each track shoe in Fig. 1a of the drawings it should be understood that each shoe is provided with lifting means at each end, or that suitable linkage is provided to enable one such lifting means to simultaneously lift both ends of the shoe.

Each of the brackets 126 has associated therewith lifting means indicated generally by the reference numeral 127 and comprising a body 128 having a bore therein in which is mounted a piston 130 provided with a stem which is pivotally connected to one of the arms 125 at a point intermediate the point of connection of the arm 125 with the bracket 126 and with the link 124.

The pistons 130 have at the lower faces thereof chambers 132 adapted to be supplied with fluid under pressure, and as will be understood, on an increase in the pressure of the fluid in the chambers 132 force is exerted through the pistons 130 upon the arms 125, and this force is transmitted through the links 124 to exert upwardly directed force upon the track shoes 120 tending to move them away from the rails 122, while a similar force is exerted through the bodies 128 and the brackets 126 upon the vehicle structure to press the vehicle wheels against the rails.

This brake equipment includes a valve device indicated generally by the reference numeral 135 and provided with a chamber 136 which is connected by way of a branched pipe 138 with the chambers 132 in the bodies 128. Each branch of the pipe 138 is provided with a choke or restricted portion 139 for restricting the rate of supply of fluid under pressure to or the release of fluid under pressure from the chamber 132.

The valve device 135 also has a chamber 140 therein which is constantly connected by way of a pipe 141 with a source of fluid under pressure, such as the supply reservoir 2.

A double seating valve element 142 is mounted in the chamber 136 to control communication from the chamber 140 to the chamber 136, and to also control communication between the chamber 136 and an atmospheric passage 144. The valve element 142 is provided with the seat adapted to engage a seat rib surrounding a passage leading from the chamber 140, and is provided with another seat which is adapted to engage a seat rib surrounding a passage leading from the chamber 136 to the atmospheric passage 144. A spring 146 is mounted in the chamber 140 and yieldingly urges the double seating valve element 142 to its upper seated position, in which a seat carried thereby engages the seat rib surrounding the passage leading from the chamber 136 to the atmospheric passage 144, and in which communication is opened from the chamber 140 to the chamber 136.

The stem of the valve element 142 has secured thereon a piston 147 which is mounted in a bore in the body of a valve device 135, and has at its upper face a chamber 148, which is constantly connected by way of a pipe 149 with a chamber 152 of a magnet valve device 150. The chamber 152 is constantly connected to the atmosphere by way of a restricted port 154, while the body of the valve device 150 has a chamber 155 therein which is constantly connected by way of a pipe 156 with a volume reservoir 158 which is proportioned to hold a predetermined quantity of fluid under pressure. The valve device 150 has, in addition, a chamber 159 therein, which is constantly connected by way of a pipe 160 to the pipe 141 leading from the supply reservoir 2.

A double seating valve element 162 is mounted in the chamber 155 to control communication between the chamber 155 and the chamber 152, and to also control communication between the chamber 159 and the chamber 155. A spring 163 is mounted in the chamber 159 and yieldingly urges the double seating valve element 152 to its upper seated position to cut off communication from the chamber 155 to the chamber 152, and to permit communication between the chamber 159 and the chamber 155 so that fluid under pressure is supplied from the reservoir 2 to the chamber 155 and thence by way of the pipe 156 to the reservoir 158 to charge this reservoir with fluid under pressure. Upon energization of the winding, not shown, of the magnet valve device 150 the double seating valve element 162 is moved to its lower seated position to cut off the supply of fluid under pressure to the chamber 155 and to permit fluid to flow therefrom to the chamber 152, and thence by way of the pipe 149 to the chamber 148 at the face of the piston 147 of the valve device 135.

One terminal of the winding of the magnet valve device 150 is connected to one side of the battery 81 by way of a branch of the wire 80, while the other terminal of the winding of the magnet valve device 150 is connected by way of a wire 164 to the wire 110, and thus to the movable contact 111 associated with the retardation control device 7.

The brake equipment also includes means associated with the retardation control device 7 for controlling the energization of the track shoes 120. The brake equipment includes a retarded release relay 165 having a movable contact 166 which controls a circuit between the trolley 168, and a wire 169 which is connected to one terminal of the windings of each of the track shoes 120, while the other terminals of these windings are connected to ground. The movable contact 166 is normally biased to the open position, and upon energization of the winding of this relay, the contact 166 is moved to the closed position, while upon the interruption of the supply of current to the winding of the relay 165 the movable contact 166 is held in the closed position for a brief time interval to maintain the circuit through the windings of the track shoes for a purpose to be hereinafter more fully explained.

One terminal of the winding of the retarded relay 165 is connected to one terminal of the battery 81 by way of a branch of the wire 80, while the otheer terminal of the winding of the relay 165 is connected by way of a branch of the wire 164 to the movable contact 111 so that when the slide or crosshead 58 of the retardation control device 7 is moved to the position in which the shoe 115 presses against and closes the movable contact 111, current is supplied to the winding of the retarded relay 165, and results in the supply of current to the windings of the track shoes.

The lifting means 127 associated with the track shoes 120 have associated therewith means for controlling the energization of the winding of the relay 108 to thereby determine whether the degree of application of the brakes on the vehicle is limited by the photo-electric means 39, or by the photo-electric means 40.

One terminal of the winding of the relay 108 is connected to one terminal of the battery 81 by way of a branch of the wire 80, while the other terminal of the winding of the relay 108 is connected by way of a wire 170 to a stationary contact which is adapted to be engaged by a movable contact 172 associated with the lifting means 127 for one of the track shoes 120. The movable contact 172 is yieldingly urged to the closed position by means of a spring 174, while the lower end of the stem of the contact is adapted to be engaged by the arm 125 on a predetermined upward movement of this arm to move the contact against the spring 174 to the open position. The movable contact 172 is adapted to engage another stationary contact which is connected by way of a wire 176 to a stationary contact which is adapted to be engaged by a movable contact 178. The movable contact 178 has a spring 180 associated therewith and yieldingly urging the contact to the open position, while this contact has a movable abutment in the form of a diaphragm 182 associated therewith and operated upon a predetermined increase in the pressure of the fluid in the chamber 132 of the lifting means 127 to move the movable contact 178 against the spring 180 to the closed position.

The movable contact 178 is also adapted to engage a stationary contact which is connected by way of a wire 183 with a stationary contact associated with the movable contact 178 associated with the lifting means 127 for the other of the track shoes 120. This movable contact is also adapted to engage a stationary contact which is connected by way of a wire 176 with a stationary contact which is adapted to be engaged by a movable contact 172, while this movable contact 172 also engages a stationary contact which is connected by way of a wire 185 with a terminal of the battery 81. It will be seen, therefore, that the movable contacts 172 and the movable contacts 178 are arranged in series and control the circuit from one terminal of the battery 81 to one terminal of the winding of the relay 108, while the other terminal of this winding is constantly connected to the other terminal of the battery. When all of the movable contacts above referred to are in their closed positions a circuit is established through the winding of the relay 108, while this circuit is interrupted if any of the movable contacts are in their open positions.

When each of the track shoes is provided with separate lifting means for each end, the contacts 172 and 178 of the various lifting means are connected in series in the manner described above so that the circuit controlled by these contacts will be interrupted in the event that any one of the contacts is in its open position.

Operation of adhesion increasing means while brakes are released and during normal service applications of the brakes During operation of the vehicle with the brakes released, and with pressure applied to the heel portion of pedal 65 to maintain the insulating element 74 out of engagement with the movable contact 76, as shown in Fig. 1 of the drawings, and also during normal service applications of the brakes, the supply and release of fluid under pressure to and from the brake cylinder 1 is controlled by the photo-electric means 38, as described in detail above.

At these times the movable contact 111 does not engage the stationary contact 114, and hence current is not supplied from the wire 87 to the wire 110, and to the wire 164 leading to the retarded relay 165 and to the winding of the magnet valve device 150. Accordingly the windings of this relay and of the magnet valve device 150 are deenergized. As the winding of the retarded relay is deenergized, the movable contact 166 of this relay is maintained in the open position with the result that the windings of the track shoes 120 are deenergized.

In addition, as the winding of the magnet valve device 150 is deenergized, the double seating valve element 162 of this valve device is maintained in its upper seated position by the spring 163 to cut off the supply of fluid under pressure from the chamber 155 to the chamber 152, and to permit the supply of fluid under pressure from the supply reservoir 2 to the chamber 155 and thence by way of the pipe 156 to the reservoir 158 to charge this reservoir with fluid at the pressure supplied from the reservoir 2.

At this time the chamber 152, being connected to the atmosphere by way of the restricted passage 154, is at atmospheric pressure and fluid at atmospheric pressure is present in the chamber 148 at the face of the piston 147 of the valve device 135. Accordingly, the double seating valve element 142 of the valve device 135 is held in its upper seated position by the spring 146 to cut off communication from the chamber 136 to the atmospheric passage 144, while communication is opened between the chamber 140 and the chamber 136 so that fluid under pressure supplied from the supply reservoir 2 to the chamber 140 flows to the chamber 136, and thence by way of the branched pipe 138 and through the restricted passages or chokes 139 to the chambers 132 at the lower faces of the pistons 130 of the lifting means 127 associated with the track shoes 120. The pressure of the fluid in these chambers, therefore, will be substantially the same as in the reservoir 2, and the force exerted by this fluid under pressure upon the pistons 130 is sufficient to hold the levers or arms 125 in the positions in which they are shown and cause the track shoes 120 to be held away from the rails 122, while the levers or arms 125 engage the lower ends of the stems of the contacts 172 and hold them against the springs 174 to interrupt the circuit controlled thereby.

At this time, because of the relatively high pressure present in the chambers 132, the diaphragms 182 associated with the movable contacts 178 maintain these contacts in their closed positions against the springs 180. However, at this time, the circuit controlled by the movable contacts 178 is interrupted by the movable contacts 172, and hence the supply of current to the winding of the relay 108 is cut off and the movable contacts 108a, 108b, and 108c are maintained in the positions in which they are shown in Fig. 1 of the drawings.

Operation of brake equipment on relatively heavy applications

If, at this time, the operator desires to effect a relatively heavy application of the brakes and exerts force upon the toe portion of the pedal 65 of the foot pedal device 8 to move it downwardly substantially to the end of its range of movement, the crosshead or slide 58 will be moved to a position in which the shoe 115 carried thereby engages and presses upon the movable contact 111 to cause it to engage the contact 114 to complete a circuit from the battery through the wire 87 to the wire 110, to which is connected the wire 164. On the supply of current to the wire 110, current flows through the movable contact 108a, associated with the relay 108, to the winding of the relay 95 and this relay is operated to cause the movable contacts 95a and 95b to transfer the control of the relays 85 and 99 from the photo-electric means 38 to the photo-electric means 39, as explained in detail above.

In addition, upon the supply of current to the wire 110, current flows to the wire 164 and to the winding of the retarded relay 165, and upon energization of this winding the movable contact 166 is moved to the closed position to complete the circuit from the trolley 168 through the windings of the track shoes 120 to energize these windings.

In addition, upon the supply of current to the wire 164, current is supplied to the winding of the magnet valve device 150 and the double seating valve element 162 thereof is moved against the spring 163 to its lower seated position to cut off the supply of fluid under pressure to the chamber 155 and thence to the reservoir 158, while communication is opened from the reservoir 158 and the chamber 155 to the chamber 152, from which fluid under pressure flows by way of the pipe 149 to the chamber 148 at the face of the piston 147 of the valve device 135.

On an increase in the pressure of the fluid in the chamber 148 force is exerted on the piston 147 to move the double seating valve element 142 downwardly against the spring 146 to thereby cut off the supply of fluid from the supply reservoir 2 and the chamber 140 to the chamber 136, from which fluid is supplied to the chambers 132 of the lifting means 127 associated with the track shoes. In addition, upon this movement of the double seating valve element 142 fluid is released from the chamber 136 to the atmosphere through the passage 144, and fluid is accordingly released from the chambers 132 at the faces of pistons 130 at restricted rates through the chokes 139.

On the release of fluid under pressure from the chambers 132, there is a decrease in the force exerted on the pistons 130 and these pistons are no longer able to maintain the track shoes 120 out of engagement with the rails 122, and the shoes are thereupon moved into engagement with the rails 122, while the arms 125 are moved downwardly and permit the springs 174 to move the movable contacts 172 to their closed positions.

The windings of the track shoes 120 are energized at this time by current supplied from the trolley 168 by the relay 165, and a relatively great magnetic force of attraction is created tending to maintain the track shoes in engagement with the rails as soon as the shoes are moved into engagement with the rails.

In addition, on the release of fluid under pressure from the chambers 132 there is a corresponding reduction in the force exerted on the diaphragms 182 and the springs 180 associated with the movable contacts 178 move these contacts to their open positions, thus interrupting the circuit controlled thereby. The various parts of the equipment are arranged and proportioned so that the movable contacts 178 will be operated to interrupt the circuit controlled thereby before the movable contacts 172 are operated to engage the contacts associated therewith, with the result that the circuit through the winding of the relay 108 will be maintained deenergized during movement of the track shoes 120 into engagement with the rails.

On movement of the double seating valve element 142 of the magnet valve device 150 to its lower seated position to permit the supply of fluid under pressure from the reservoir 158 to the chamber 148 at the face of the piston 147 of the valve device 135, fluid under pressure is vented from the chamber 152 through the restricted passage 154 at a restricted rate.

After a relatively short time interval, the pressure of the fluid remaining in the reservoir 158, and in the chamber 148 at the face of the piston 147, will be reduced by the release of fluid through the restricted passage 154 so that the force exerted upon the piston 147 by this fluid under pressure is insufficient to maintain the piston 147 and the double seating valve element 142 against the opposing force of the spring 146. As a result, therefore, the double seating valve element 142 is moved from its lower seated position to its upper seated position by the spring 146 to cut off communication between the chamber 136 and the atmospheric passage 144, and to open communication from the chamber 140 to the chamber 136 to permit fluid under pressure supplied from the supply reservoir 2 to flow to the branched pipe 138, and thence through the restricted passages or chokes 139 to the chambers 132 at the faces of the pistons 130.

At this time, as pointed out above, the windings of the track shoes 120 are energized by current supplied thereto from the trolley 168, and, accordingly, a relatively great magnetic force of attraction is created tending to maintain the track shoes 120 in engagement with the rails 122.

On the supply of fluid under pressure to the chambers 132 the pressure in these chambers builds up and force is exerted through the pistons 130 tending to lift the shoes away from the rails. The various parts of the equipment are arranged and proportioned, however, so that when the pressure of the fluid in the chambers 132 has equalized with the pressure of the fluid in the reservoir 2, a predetermined force is exerted by the pistons 130 upon the track shoes 120 tending to lift them away from the rails, and also so that this force is less by a predetermined amount than the magnetic force of attraction tending to hold the track shoes against the rails. Accordingly, the track shoes 120 will be maintained in engagement with the rails so that the maximum magnetic force of attraction will be developed between the track shoes and the rails as a result of the energization of the windings of these shoes.

As the track shoes 120 remain in engagement with the rails, some braking force is developed between these shoes and the rails and tending to retard the vehicle. However, because of operation of the lifting means associated with the track shoes, only limited force is available to press the shoes against the rails, and, accordingly, only limited braking force is developed between the track shoes and the rails.

In addition to the force exerted by the lifting means tending to lift the shoes away from the rails, an equal, but opposite force is developed through the vehicle structure by this means on the vehicle wheels, not shown, tending to press the vehicle wheels against the rails. This force is in addition to, and supplements, the force exerted on the vehicle wheels by the weight of the vehicle which is supported on the wheels. As the vehicle wheels are pressed against the rails with a force exceeding that exerted by the weight of the vehicle alone, there is substantially greater adhesion between the vehicle wheels and the rails on which they operate, and, accordingly, substantially greater braking effect can be transmitted through the vehicle wheels without producing wheel sliding than would be the case if this supplementary or additional force was not present to press the vehicle wheels against the rails.

The vehicle equipment provided by this invention incorporates means automatically operable while the adhesion increasing means is conditioned to increase the adhesion between the vehicle wheels and the rails to condition the retardation control device 7 to control the brake equipment to produce a higher degree of braking effect through the vehicle wheels than was previously permitted by this device.

As stated above, on the release of fluid under pressure from the chambers 132, the levers 125 are moved downwardly, while the track shoes 120 are moved into engagement with the rails. Upon this movement of the arms 125 the springs 174 associated with the movable contacts 172 move these contacts to their closed positions, and on the subsequent resupply of fluid under pressure to the chambers 132 the track shoes 120 are held in engagement with the rails and the levers 125 are not moved upwardly far enough to cause the contacts 172 to be moved to their open positions.

In addition, on an increase in the pressure of the fluid in the chambers 132 substantially to the value normally carried in these chambers, so that substantially the normal amount of force is exerted on the track shoes tending to lift them upwardly, the diaphragms 182 are moved against the springs 180 and move the movable contacts 178 to their closed positions, thus completing the circuit from the battery to the winding of the relay 108.

On the supply of current to the winding of the relay 108 the movable contacts 108a, 108b and 108c are moved from the position in which they are shown in Fig. 1. The movable contact 108a is moved away from the contact to which is connected the wire 110, thereby interrupting the circuit from the battery 81 to the winding of the relay 95 with the result that the movable contacts 95a and 95b of this relay are moved to the positions in which they are shown in Fig. 1.

As a result of this movement of the movable contacts 95a and 95b, the control of the brake equipment is transferred from the photo-electric means 39 back to the photo-electric means 38, as described in detail above, with the result that even though the weighted body 28 is moved by the force of inertia to a position in which the fin 35 carried thereby permits the light beams associated with the photo-electric cells 48 and 49 to impinge upon these cells, current will not be supplied from these cells to the windings of the relays 85 and 99. The windings of these relays will be maintained deenergized until the weighted body 28 is moved to a position in which the fin 34 carried thereby permits the light beams associated with the photo-electric cells 45 and 46 to impinge upon these cells. Because of the position to which the crosshead 58 has been moved the weighted body 28 will not be moved to this position until the body has been moved somewhat farther to the right against the spring 30 than is required to move the fin 35 out of the path of the light beams associated with the photo-electric means 39, and, accordingly, the retardation control device 7 will be conditioned to produce a somewhat higher degree of braking effect through the vehicle wheels than is produced by operation of the photo-electric means 39.

At this time, because the adhesion between the vehicle wheels and the rails is increased by operation of the adhesion increasing means, a higher degree of braking effort may be transmitted through the vehicle wheels without producing wheel sliding.

The various parts of the retardation control device 7 are arranged and proportioned so that the photo-electric means 38 cannot be moved to the right, as viewed in the drawings, beyond a point at which the retardation control device 7 is operative to produce a predetermined maximum rate of retardation of the vehicle and a corresponding maximum degree of application of the brakes. This maximum degree of brake application which can be effected by the retardation control device 7 by this movement of the photo-electric means 38 is less than that which will produce wheel sliding while the adhesion between the vehicle wheels and the rails is augmented by operation of the adhesion increasing means.

Accordingly, the degree of application of the brakes will be controlled by the photo-electric means 38, and when the weighted body 28 is moved to the position to permit the light beams associated with the cells 45 and 46 to impinge upon these cells, currents will be supplied to the relays 85 and 99 to condition these relays to supply current to the windings of the magnet valve devices 4 and 5, and thus control the degree of application of the brakes. As will be understood, the degree of application of the brakes which the photo-electric means 38 is effective to produce varies in accordance with the position to which this means is moved by operation of the pedal 65.

*Operation of equipment in event of failure of the adhesion increasing means*

If the track shoes 120 should lose their grip on the rails 122 for any reason, such as failure of the supply of current by the trolley 168 to the windings of the track shoes, the increased adhesion between the vehicle wheels and the rails produced by the adhesion increasing means provided by this invention and operating through the track shoes will be lost. If the same high degree of braking effect is maintained through the vehicle wheels after this reduction in the adhesion between the vehicle wheels and the rails, wheel sliding may result.

The brake equipment provided by this invention, therefore, incorporates means operable automatically in the event that the track shoes lose their grip on the rails to condition the retardation control device 7 to permit only that degree of application of the brakes which can be transmitted through the vehicle wheels without producing wheel sliding while the adhesion between the wheels and the rails is not augmented by operation of the adhesion increasing means.

If the track shoes 120 should lose their grip on the rails 122 for any reason, there will be a reduction in the force opposing upward movement of the track shoes and the fluid under pressure present in the chambers 132 of the lifting means 127 will expand and move the pistons 130 upwardly very rapidly, thereby lifting the track shoes 120 away from the rails. On this upward movement of the pistons 130 there is a corresponding rapid increase in the volume in the chambers 132, while there will be a similar rapid reduction in the pressure of the fluid in these chambers as fluid under pressure is supplied to these chambers only at restricted rates through the chokes 139.

On this sudden reduction in the pressure of the fluid in the chambers 132 there is a corresponding reduction in the pressure of the fluid operating on the diaphragms 182, and the springs 180 move the movable contacts 178 from their closed positions to their open positions, thus opening the circuit through the winding of the relay 108.

On deenergization of the winding of the relay 108 the movable contacts 108a, 108b, and 108c thereof are moved from their upper positions to the positions in which they are shown in Fig. 1 of the drawings. On this movement of the contact 108a it engages the contact to which is connected the wire 110, which is energized at this time as the contact 111 is held in engagement with the contact 114 by the shoe 115, with the result that current is supplied to the winding of the relay 95, and the movable contacts 95a and 95b thereof are moved from the positions in which they are shown in Fig. 1 of the drawings to their upper positions to thereby transfer control of the relays 85 and 99 from the photo-electric means 38 to the photo-electric means 39.

It is assumed that at this time pressure is maintained on the heel portion of the pedal 65 of the foot pedal device 8 so that the insulating member 74 is held out of engagement with the movable contact 76 and permits this contact to engage the stationary contact 78 to supply current to the wire 97, and thus to the winding of the relay 91 so that the movable contacts 91a, 91b, and 91c thereof are maintained in the positions in which they are shown in Fig. 1 of the drawings.

If at the time the control of the relays 85 and 99 is transferred from the photo-electric means 38 to the photo-electric means 39, the vehicle is decelerating at a relatively rapid rate, the weighted body 28 will be held by the force of inertia in a position in which the fin 35 carried thereby does not interrupt the light beams directed at the photo-electric cells 48 and 49. These cells, therefore, will generate electric currents which will be supplied to the windings of the relays 85 and 99, and these relays will thereupon operate to supply current to the windings of the magnet valve devices 4 and 5 to cause these valve devices to cut off the supply of fluid under pressure to the brake cylinder and to release fluid under pressure therefrom, and thus reduce the degree of brake application effected through the vehicle wheels.

As a result of this reduction in the degree of application of the brakes on the vehicle there will be a reduction in the rate of retardation of the vehicle and the weighted body 28 will be moved by the spring 30 to the left, as viewed in Fig. 1 of the drawings, and when the weighted body 28 has been moved to a predetermined position, the notched left hand end of the fin 35 will intercept the light beam directed at the photo-electric cell 49 and this cell will no longer generate current. Current, therefore, will not be supplied to the winding of the relay 85 and this relay will operate to cut off the supply of current to the winding of the release magnet valve device 5 with the result that the valve 20 thereof will be moved to the seated position by the spring 21 to cut off the release of fluid under pressure from the brake cylinder 1.

If there is a further reduction in the rate of retardation of the vehicle, the weighted body 28 will be moved farther to the left by the spring 30, and the fin 35 will cut off the light beam directed at the photo-electric cell 48, thereby interrupting the supply of current to the winding of the relay 99. This relay will then operate to cut off the supply of current to the winding of the application magnet valve device 4 and the valve 15 thereof will be moved to the open position by the spring 16 to permit the supply of fluid under pressure from the supply reservoir 2 to the brake cylinder 1 to increase the degree of application of the brakes and cause the rate of retardation of the vehicle to be maintained at the value determined by the photo-electric means 39.

It will be seen, therefore, that if for any reason the track shoes 120 lose their grip on the rails 122 the retardation control device 7 will be automatically conditioned to effect only that degree of application of the brakes permitted by the photo-electric means 39. As pointed out above, this photo-electric means is arranged to effect only that degree of application of the brakes which can be transmitted through the vehicle wheels without producing wheel sliding when the adhesion between the vehicle wheels and the rails is not augmented by operation of the adhesion increasing means.

*Release after a relatively heavy application*

If after a relatively heavy application of the brakes has been effected, and while the adhesion increasing means is functioning, manually applied pressure is released from the toe portion of the pedal 65 of the foot pedal device 8 to permit the toe portion to be moved upwardly by the spring 71, the crosshead or slide 58 carrying the photo-electric means 38 is moved to the position in which it is shown in Fig. 1 of the drawings, and on this movement of the crosshead 58, the shoe 115 carried thereby is moved out of engagement with the movable contact 111 and this contact is separated from the stationary contact 114. On movement of the contact 111 away from the contact 114 the circuit from the battery 81 by way of the wire 87 to the wire 110 is interrupted, while no current will be supplied from the wire 110 to the wire 164 leading to the retarded relay 165. On the interruption of the supply of current to the retarded relay 165, this relay continues to maintain the circuit controlled thereby for a predetermined time interval with the result that the windings of the track shoes 120 remain energized and a powerful magnetic force is maintained to hold these shoes in engagement with the rails.

On movement of the photo-electric means 38 towards the release position, if the vehicle is in motion and its movement is being retarded at a substantial rate, the weighted body 28 will be held by inertia against the spring 30 with the result that before the photo-electric means 38 is moved all the way to the release position the fin 34 is no longer operative to intercept the light beams directed at the photo-electric cells 46 and 45, and these cells will supply current to the windings of the relays 85 and 99 to operate these relays to supply current to the windings of the application and release magnet valve devices 4 and 5 to cut off the supply of fluid under pressure to the brake cylinder and to release fluid under pressure therefrom, thereby reducing the degree of application of the brakes.

As the retarded relay 165 is maintained in the closed position for a time interval after the interruption of the circuit through the winding of this relay, the circuit through the windings of the track shoes 120 is maintained and the track shoes are effective to increase the adhesion between the vehicle wheels and the rails, and to exert a retarding force on the vehicle for a time interval subsequent to the movement of the photo-electric means 38 towards the brake releasing position, thus giving the brake controlling mechanism an opportunity to reduce the pressure of the fluid in the brake cylinder 1 and thereby reduce the degree of application of the brakes before the adhesion increasing means is released.

In addition, upon the movement of the crosshead 58 to a position to permit the movable contact 111 to disengage the stationary contact 114 and thereby interrupt the supply of current to the wire 164, the supply of current to the winding of the magnet valve device 150 is interrupted, and the double seating valve element 162 of this magnet valve device is moved by the spring 163 from the lower seated position to the upper seated position to cut off communication between the chamber 155 and the chamber 152, and to permit communication between the chamber 159 and the chamber 155, thereby permitting fluid under pressure supplied from the supply reservoir 2 to flow to the reservoir 158 to charge this reservoir with fluid under pressure.

After a predetermined time interval, the movable contact 166 of the retarded relay 165 is moved to the open position, thereby interrupting the circuit to the windings of the track shoes 120, thus causing the magnetic force of attraction between the shoes and the rails to decrease. On this reduction in the force tending to hold the shoes in engagement with the rails, the fluid under pressure present in the chambers 132 of the lifting means 127 exerts sufficient force through the pistons 130 to lift the track shoes 120 away from the rails 122.

On this movement of the pistons 130 there is an increase in the volume of the chambers 132 and a corresponding reduction in the pressure of the fluid present therein, as fluid under pressure is supplied to these chambers only at a restricted rate through the chokes 139, with the result that an appreciable time interval will elapse before the pressure of the fluid in the chambers 132 is increased to the pressure of the fluid in the reservoir 2 by the supply of fluid thereto through the chokes 139.

On the reduction in the pressure of the fluid in the chambers 132 resulting from movement of the pistons 130, there is a corresponding reduction in the pressure of the fluid acting upon the diaphragms 182 and the springs 180, therefore, move the movable contacts 178 away from the stationary contacts associated therewith, thus causing the circuit controlled by these contacts to be interrupted substantially as soon as the pistons 130 operate to move the shoes 120 away from the rails 122.

Upon further movement of the pistons 130 the arms 125 engage the ends of the movable contacts 172 and move these contacts against the springs 174 so that they interrupt the circuit which is also controlled by the contacts 178.

After a further brief time interval, the pressure of the fluid in the chambers 132 will have been increased by the supply of fluid through the chokes 139 substantially to the pressure of the fluid in the supply reservoir 2, and on this increase in the pressure of the fluid in the chambers 132, the force exerted through the diaphragms 182 is sufficient to move the movable contacts 178 against the springs 180 to their closed positions, but before this action occurs, the circuit controlled by the movable contacts 178 will have been interrupted by the movable contacts 172.

On operation of either of the movable contacts 178 or 172 to interrupt the circuit controlled thereby, the circuit through the winding of the relay 108 is interrupted. On the interruption of the circuit through the winding of the relay 108, the contact 108a is moved to its closed position in which it engages the stationary contact to which is connected to the wire 110, but this is without effect as the wire 110 has already been deenergized by movement of the shoe 115 out of engagement with the contact 111, thereby permitting the contact 111 to move away from the contact 114. Accordingly, the winding of the relay 95 remains deenergized, and the contacts 95a and 95b remain in the positions in which they are shown in Fig. 1 of the drawings.

In addition, upon deenergization of the winding of the relay 108, the contacts 108b and 108c are moved to the positions in which they are shown in Fig. 1 of the drawings, but their movement is without effect as the circuits through these contacts are interrupted by the movable contacts 91a and 91b, which at this time are in their upper positions, as shown in Fig. 1 of the drawings, assuming that pressure is maintained on the heel portion of the pedal 65 so that the contact 76 engages the contact 78 and supplies current to the winding of the relay 91.

The control of the brake equipment, therefore, remains in the photo-electric means 38, while the track shoes 120 remain in their upper positions out of engagement with the rails until a further relatively high degree of brake application is desired by the operator.

*Operation of the brake equipment on a deadman emergency application*

The brake equipment provided by this invention also operates automatically in the event of the release of manually applied pressure from the heel portion of the pedal 65 of the foot pedal device 8 to automatically effect operation of the adhesion increasing means, and to condition the braking means to produce the maximum permissible braking effect through the vehicle wheels.

On the release of manually applied pressure from the heel portion of the pedal 65, the spring 72 moves the lever 68 about the pin 69 so that the insulating element 74 engages the movable contact 76 and moves it away from the stationary contact 78, thereby interrupting the supply of current to the wire 97 from the wire 87, which is connected to the battery 81. When the supply of current to the wire 97 is cut off, the supply of current to the winding of the relay 91 is cut off, and the movable contact 91c associated with this relay is moved into engagement with a stationary contact to which is connected a branch of the wire 87 so that current is supplied from the wire 87 to the wire 164, which is connected to the movable contact 91c.

On the supply of current to the wire 164 by the movable contact 91c, current is supplied to the winding of the relay 165, and the movable contact 166 of this relay is moved to the position to establish the circuit from the trolley 168 to the windings of the track shoes 120.

In addition, upon the supply of current to the wire 164, current is supplied to the winding of the magnet valve device 150, and this valve device is operated, as described above, to cut off the supply of fluid under pressure to the reservoir 158, and to supply fluid from this reservoir to the valve device 135 to first condition this valve device to release fluid from the chambers 132 of the lifting means 127 associated with the track shoes 120, and to thereafter condition this valve device to supply fluid under pressure to the lifting means 127 associated with the track shoes.

As a result, therefore, the windings of the track shoes 120 will be energized and the track shoes will be moved into engagement with the rails 122, while fluid under pressure will thereafter be supplied to the lifting means to exert force between the track shoes and the vehicle structure to increase the force exerted on the vehicle wheels to press them against the rails, as described in detail above.

As a result of operation of the lifting means associated with the track shoes, the circuit from the battery through the winding of the relay 108 is completed, as described in detail above, and upon energization of the winding of this relay, the movable contacts associated therewith, are moved from the position in which they are shown in Fig. 1 of the drawings. As a result of movement of the movable contact 108a, the supply of current from the wire 164 to the winding of the relay 95 is cut off.

However, in the time interval subsequent to the supply of current by the contact 91c of the relay 91 and prior to the interruption by the relay 108 of the circuit from the wire 164 to the winding of the relay 95, the winding of the relay 95 will have been energized and the movable contacts 95a and 95b associated therewith, will have been moved from the positions in which they are shown in the drawings to their upper positions, thereby transferring control of the relays 85 and 99 from the photo-electric means 38 to the photo-electric means 39.

At this time the light beams associated with the cells of the photo-electric means 39 are intercepted by the fin 35, and, accordingly, no current is supplied by these cells to the windings of the relays 85 and 99. The movable contacts of these relays, therefore, are moved to their open positions, if they are not already in their open positions, and no current will be supplied to the windings of the magnet valve devices 4 and 5. As a result, therefore, the valve 20 of the release magnet valve device 5 is moved to the seated position by the spring 21 to cut off the release of fluid under pressure from the brake cylinder 1, while the valve 15 of the application magnet valve device 4 is moved to the open position by the spring 16 to permit the supply of fluid under pressure from the reservoir 2 to the brake cylinder 1 to effect an application of the brakes.

As soon as current is supplied to the winding of the relay 108 as a result of operation of the lifting means 127 associated with the track shoes 102, as explained in detail above, the movable contact 108a is moved to the open position and interrupts the circuit through the winding of the relay 95 permitting the movable contacts 95a and 95b thereof to move to the positions in which they are shown in Fig. 1 of the drawings.

In addition, at the same time, the movable contact 108b moves from the position in which it establishes contact with a branch of the wire 106 to a position in which it engages a contact to which is connected a wire 180 leading from one terminal of the cell 53 of the photo-electric means 40. The winding of the relay 91 is deenergized at this time, because the contact 76 is held away from the contact 78, as explained above, and the movable contact 91a engages a contact to which is connected a wire 182 leading from the contact 108b, and a circuit is established from the photoelectric cell 53 through the winding of the relay 85 which is traced from the wire 180 through the movable contact 108b to the wire 182, and through the movable contact 91a to the wire 90 to one terminal of the winding 85. The other terminal of the winding 85 is connected by way of the wire 89 to the other terminal of the photo-electric cell 53.

Similarly, on upward movement of the movable contact 108c from the position in which it is shown in Fig. 1 of the drawings, it engages a contact to which is connected a wire 185 leading from one terminal of the photo-electric cell 52, while the movable contact 108c is moved out of engagement with the contact to which is connected a branch of the wire 105. On this movement of the movable contact 108c, a circuit is established from the photo-electric cell 52 to one terminal of the winding of the relay 99 which is traced from the wire 185 through the movable contact 108c to a wire 186, which, at this time, is engaged by the movable contact 91b, which is connected by way of the wire 190 to one terminal of the winding of the relay 99. The other terminal of the winding of the relay 99 is connected by way of the wire 89 to the other terminal of the photo-electric cell 52.

Accordingly, on movement of the arm or lever 68 of the foot pedal device 8 to the position to cause the movable contact 76 to be disengaged from the stationary contact 78 and thus interrupt the supply of current to the winding of the relay 91, the control of the relays 85 and 99 is first transferred from the photo-electric means 38 to the photo-electric means 39, and is thereafter transferred from the photo-electric means 39 to the photo-electric means 40 as soon as the adhesion increasing means has been operated to produce a predetermined degree of force to press the vehicle wheels against rails.

*Operation in the event of failure of the adhesion increasing means during a deadman emergency application*

If during an emergency application of the brakes produced by the release of manually applied pressure to the heel portion of the pedal 65 of the foot pedal device 8, the track shoes 120 lose their grip on the rails so that the increased adhesion between the vehicle wheels and the rails produced through the track shoes is lost, the brake equipment provided by this invention operates automatically to transfer control of the brakes from the photo-electric means 40 to the photo-electric means 39 to thereby reduce the degree of application of the brakes to a value which will not produce wheel sliding.

If the track shoes 120 lose their grip on the rails 122 the contacts 178 or 172 associated with the lifting means 127 for the track shoes 120 will operate, as described in detail above, to interrupt the circuit from the battery 81 to the winding of the relay 108.

When the supply of current to the winding of the relay 108 is interrupted the movable contacts 108a, 108b, and 108c, of this relay are moved from their upper position to the positions in which they are shown in Fig. 1 of the drawings. By this movement the contacts 108b and 108c are moved out of engagement with the stationary contacts to which are connected the wires leading from the cells of the photo-electric means 40, and into engagement with stationary contacts to which are connected the wires leading from the cells of the photo-electric means 39 thereby transferring control of the braking means from the photo-electric means 40 to the photo-electric means 39, which thereupon operates, as described above, to reduce the degree of application of the brakes to a value which will not cause wheel sliding while the adhesion increasing means is ineffective.

On this movement of the contact 108a, it engages the stationary contact to which is connected the wire 110, which at this time is supplied with current from the battery 81 by the wire 164 leading from the movable contact 91c of the relay 91. As a result, therefore, current will be supplied to the winding of the relay 95 and the movable contacts 95a and 95b thereof will be moved from the position in which they are shown in Fig. 1 of the drawings to their upper positions in which they engage stationary contacts to which are connected wires leading from the photo-electric means 39. However, this movement of the movable contacts 95a and 95b is without effect as the circuits leading from these contacts are open at this time, since the movable contacts 91a and 91b of the relay 91 are in their lower positions.

*Release after a deadman emergency*

Assuming that the control of the brakes has been retained by the photo-electric means 40, if it is desired to effect the release of the brakes following the application of the brakes by operation of the foot pedal device 8, pressure is applied to the heel portion of the pedal 65 and the lever 68 is pivoted about the pin 69 so that the insulating member 74 is moved away from the movable contact 76, while this contact is moved into engagement with the stationary contact 78. Current is then supplied from the battery 81 by way of the wire 87 and the contacts 76 and 78 to the wire 97 and to the winding of the relay 91. Upon energization of the winding of this relay the movable contacts 91a, 91b and 91c thereof are moved from their lower positions to the positions in which they are shown in Fig. 1 of the drawings, in which the contact 91c does not engage the stationary contact to which is connected the branch of the wire 87 to thereby cut off the supply of current from the wire 87 to the wire 164.

On the interruption of the supply of current to the wire 164 the winding of the magnet valve device 150 is deenergized and the double seating valve element 162 thereof is moved by the spring 163 from its lower seated position to its upper seated position, and fluid under pressure is again supplied from the supply reservoir 2 to the reservoir 158 to charge this reservoir with fluid under pressure.

In addition, upon the interruption of the supply of current to the wire 164, the relay 165 is deenergized, and after a brief time interval, the movable contact 166 thereof is operated to open the circuit controlled thereby, and thus cut off the supply of current to the windings of the track shoes 120 which are thereafter lifted away from the rails, while the contacts 178 and 172 are operated, as explained in detail above, to interrupt the circuit to the winding of the relay 108.

In addition, upon the interruption of the supply of current to the winding of the relay 91, the movable contacts 91a and 91b move to their lower positions in which they engage the stationary contacts to which are connected the wires 182 and 186, respectively, thereby transferring control of the relays 85 and 95 from the photo-electric means 40 back to the photo-electric means 38 carried by the crosshead 58 so that the degree of application of the brakes is thereafter controlled according to the position of the photo-electric means 38, as described in detail above.

While one embodiment of the improved vehicle brake equipment provided by this invention has been illustrated and described in detail, it should be understood that the invention is not limited to these details of construction, and that numerous changes and modifications may be made without departing from the scope of the following claims.

Having now described my invention, what I claim as new and desire to secure by Letters Patent, is:

1. In a brake equipment for a vehicle adapted to run upon a rail, braking means for exerting braking force through the vehicle wheels, a manually operated member movable from a release position through an application zone for effecting operation of the braking means, a magnetic track shoe adapted to engage the rail and being adapted when energized to be attracted thereto, lifting means associated with the vehicle and operated on the supply of fluid under pressure to exert force on the track shoe to move the shoe away from the rail and operated on the release of fluid under pressure to effect movement of the shoe into engagement with the rail, means controlled by said manually operated member for energizing said track shoe, and means controlled by said member for releasing fluid under pressure from said lifting means to effect movement of the track shoe into engagement with the rail and for thereafter supplying fluid under pressure to the lifting means to cause said lifting means to exert force on the track shoe tending to lift it away from the rail, whereby force is exerted tending to press the vehicle wheels against the rail.

2. In a brake equipment for a vehicle adapted to run upon a rail, braking means for exerting braking force through the vehicle wheels, a manually operable member movable to an application position to effect an application of said braking means, electromagnetic means associated with the vehicle and operative when energized and when in its operating position to create a magnetic force of attraction for the rail, fluid pressure operated means interposed between said electromagnetic means and the vehicle wheels and operative on the release of fluid under pressure therefrom to effect movement of the electromagnetic means towards the rail to its operating position and being operative on the supply of fluid under pressure thereto while the electromagnetic means is energized and in its operating position to exert force on the electromagnetic means tending to lift said means away from the rail, whereby force is exerted on the vehicle wheels tending to press them against the rail, and means operative on movement of the manually operable member to its application position to first release fluid under pressure from said fluid pressure operated means and to thereafter supply fluid under pressure thereto.

3. In a brake equipment for a vehicle adapted to run upon a rail, braking means for exerting braking force through the vehicle wheels, a manually operable member movable to an application position to effect an application of said braking means, electromagnetic means associated with the vehicle and operative when energized and when in its operating position to create a magnetic force of attraction for the rail, fluid pressure operated means interposed between said electromagnetic means and the vehicle wheels and operative on the relesae of fluid under pressure therefrom to effect movement of the electromagnetic means towards the rail to its operating position, and being operative on a supply of fluid under pressure thereto while the electromagnetic means is energized and in its operating position to exert force on the electromagnetic means tending to lift said means away from the rail, whereby force is exerted on the vehicle wheels tending to press them against the rail, valve means normally establishing communication between a source of fluid under pressure and said fluid pressure operated means and operative on an increase in fluid pressure to cut off the supply of fluid to said fluid pressure operated means and to release fluid therefrom, means for releasing fluid from said valve means at a restricted rate, a timing reservoir adapted to be supplied with fluid under pressure, and means operative on movement on the manually operable member to its application position for cutting off the supply of fluid under pressure to the timing reservoir and for supplying fluid under pressure from said reservoir to said valve means.

4. In a brake equipment for a vehicle adapted to run upon a rail, braking means for exerting braking force through the vehicle wheels, a member responsive to inertia for controlling the degree of application permitted said braking means, electromagnetic means associated with the vehicle, said means being movable between a normal position and an operating position and being operative in the operating position to create a force of attraction for the rail to thereby increase the adhesion between the vehicle wheels and the rails, and means controlled by said electromagnetic means for varying the degree of brake application permitted by said inertia responsive member.

5. In a brake equipment for a vehicle adapted to run upon a rail, braking means for exerting braking force through the vehicle wheels, a member responsive to inertia for controlling the degree of application permitted said braking means, electromagnetic means associated with the vehicle, said means being movable between a normal position and an operating position and being operative in the operating position to create a force of attraction for the rail to thereby increase the adhesion between the vehicle wheels and the rail, and means operative by movement of said electromagnetic means to its operating position to increase the degree of brake application permitted by said inertia responsive member.

6. In a brake equipment for a vehicle adapted to run upon a rail, braking means for exerting braking force through the vehicle wheels, a member responsive to inertia for controlling the degree of application permitted said braking means, electromagnetic means associated with the vehicle, said means being movable between a normal position and an operating position and being operative in the operating position to create a force of attraction for the rail to thereby increase the adhesion between the vehicle wheels and the rail, and means operative by movement of the electromagnetic means away from its operating position to decrease the degree of brake application permitted by said inertia responsive member.

7. In a brake equipment for a vehicle adapted to run upon a rail, braking means for exerting braking force through the vehicle wheels, a member responsive to inertia for controlling the degree of application permitted said braking means, electromagnetic means associated with said vehicle, said means being movable between a normal position and an operating position and being operative in the operating position to create a force of attraction for the rail, actuating means interposed between said electromagnetic means and the vehicle wheels for exerting force tending to move the electromagnetic means from the operating position towards the normal position and thereby create a force tending to press the vehicle wheels against the rail, and means operated in accordance with the force exerted by said actuating means for varying the degree of brake application permitted by said inertia responsive member.

8. In a brake equipment for a vehicle adapted to run upon a rail, braking means for exerting braking force through the vehicle wheels, a member responsive to inertia for controlling the degree of application permitted said braking means, electromagnetic means associated with said vehicle, said means being movable between a normal position and an operating position and being operative in the operating position to create a force of attraction for the rail, fluid pressure operated actuating means interposed between said electromagnetic means and the vehicle wheels and operated on an increase in fluid pressure to exert force tending to move the electromagnetic means from the operating position towards the normal position and thereby create a force tending to press the vehicle wheels against the rail, and means responsive to the pressure of the fluid supplied to said fluid pressure responsive means for varying the degree of brake application permitted by the inertia responsive member.

9. In a brake equipment for a vehicle adapted to run upon a rail, braking means for exerting braking force through the vehicle wheels, a member responsive to inertia for controlling the degree of application permitted said braking means, electromagnetic means associated with said vehicle, said means being movable between a normal position and an operating position and being operative in the operating position to create a force of attraction for the rail, fluid pressure operated actuating means interposed between said electromagnetic means and the vehicle wheels and operated on an increase in fluid pressure to exert force tending to move the electromagnetic means from the operating position towards the normal position and thereby create a force tending to press the vehicle wheels against the rail, and means subject to and operated on a predetermined reduction in the pressure of the fluid supplied to said pressure responsive means for reducing the degree of brake application permitted by said inertia responsive member.

10. In a brake equipment for a vehicle adapted to run upon a rail, braking means for exerting braking force through the vehicle wheels, a member responsive to inertia for controlling the degree of application permitted said braking means, electromagnetic means associated with said vehicle, said means being movable between a normal position and an operating position and being operative in the operating position to create a force of attraction for the rail, actuating means interposed between said electromagnetic means and the vehicle wheels for exerting force tending to move the electromagnetic means from the operating position towards the normal position and thereby create a force tending to press the vehicle wheels against the rail, and means controlled in accordance with the force exerted by said actuating means and also controlled by movement of the electromagnetic means away from the operating position for varying the degree of brake application permitted by said inertia responsive member.

11. In a brake equipment for a vehicle adapted to run upon a rail, braking means for exerting braking force through the vehicle wheels, a member responsive to inertia for controlling the degree of application permitted said braking means, electromagnetic means associated with said vehicle, said means being movable between a normal position and an operating position and being operative in the operating position to create a force of attraction for the rail, actuating means interposed between said electromagnetic means and the vehicle wheels and incorporating means operative on an increase in the pressure of the fluid in a chamber to exert force tending to move the electromagnetic means from the operating position towards the normal position, means for supplying fluid under pressure to said chamber at a restricted rate, and means responsive to the pressure of the fluid in said chamber for varying the degree of brake applications permitted by said inertia responsive member.

12. In a brake equipment for a vehicle adapted to run upon a rail, braking means for exerting braking force through the vehicle wheels, a manually operable member movable from a release position through an application zone for effecting applications of said braking means in accordance with the range of movement of said member in said application zone, control means for limiting to a predetermined value the degree of brake application of said braking means effected by said member, an electromagnetic element adapted to create a force of attraction for the rail, actuating means operating through said element for exerting force to press the vehicle wheels against the rail, and means responsive to the force exerted by said actuating means for rendering said control means effective or ineffective.

13. In a brake equipment for a vehicle adapted to run upon a rail, braking means for exerting braking force through the vehicle wheels, application means for effecting an application of said braking means, control means for limiting to one predetermined value the degree of brake application produced by said application means, other control means for limiting to a higher predetermined value the degree of brake application produced by said application means, an electromagnetic element adapted to create a force of attraction for the rail, actuating means operating through said element for exerting force to press the vehicle wheels against the rail, and means responsive to the force exerted by said actuating means and determining which of said control means is effective to limit the degree of brake application.

14. In a brake equipment for a vehicle adapted to run upon a rail, braking means for exerting braking force through the vehicle wheels, application means for effecting an application of said braking means, control means for limiting to one predetermined value the degree of brake application produced by said application means, other control means for limiting to a higher predetermined value the degree of brake application produced by said application means, an electromagnetic element movable between a normal position and an operating position and being operative in the operating position to create a force of attraction for the rail, actuating means operating through said element for exerting force to press the vehicle wheels against the rail, and means responsive to the force exerted by said actuating means and also responsive to movement of said element away from its operating position for determining which of said control means is effective to limit the degree of brake application.

15. In a brake equipment for a vehicle adapted to run upon a rail, braking means for effecting braking force through the vehicle wheels, an application member movable from a release position to an application position for effecting an application of said braking means, an electromagnetic element operative when energized to create a force of attraction for the rail, actuating means operative through said element when said element is energized and exerting force to press the vehicle wheels against the rail, and means operative on movement of the application member to the application position for supplying current to said element, said means being also operative on movement of the application member from the application position towards the release position to maintain the supply of current to said element for a time interval and to thereafter cut off the supply of current to said element.

16. In a brake equipment for a vehicle adapted to run upon a rail, braking means for exerting braking force through the vehicle wheels, a magnetic track shoe adapted to engage said rail, said track shoe having a winding which when energized causes the shoe to be attracted to the rail, supporting means associated with the track shoe and normally holding the track shoe above the rail and spaced therefrom, said supporting means being also operable when the track shoe is energized and in engagement with the rail to exert force between the shoe and the vehicle tending to lift the shoe away from the rail whereby force is exerted on the vehicle tending to press the vehicle wheels against the rail, a manually operable member movable between a release position and an application position for effecting applications of said braking means, and means controlled by said member and operable upon movement of said member to its application position to effect energization of the winding of said track shoe and to condition the supporting means to permit movement of the track shoe into engagement with the rail, said means being operable thereafter to maintain the winding of said shoe energized and to condition the supporting means to exert substantially greater force between the track shoe and the vehicle tending to lift the shoe away from the rail than was exerted by said supporting means during movement of the track shoe into engagement with the rail.

17. In a brake equipment for a vehicle adapted to run upon a rail, braking means for exerting braking force through the vehicle wheels, a manually operable member movable from a release position through an application zone for effecting applications of said braking means, control means for limiting to a predetermined value the degree of brake application of said braking means effected by said member, an electromagnetic element adapted to create a force of attraction for the rail, actuating means operating through said element for exerting force to press the vehicle wheels against the rail, and means responsive to movement of said electromagnetic element away from its operating position for rendering said control means ineffective.

JOHN W. LOGAN, Jr.